Oct. 11, 1927.

E. V. MYERS 1,644,848

LUBRICATION INDICATOR

Filed March 30, 1920

INVENTOR

Eugene V. Myers

By Attorneys,

Fraser, Turk & Myers

Patented Oct. 11, 1927.

1,644,848

UNITED STATES PATENT OFFICE.

EUGENE V. MYERS, OF EAST ORANGE, NEW JERSEY.

LUBRICATION INDICATOR.

Application filed March 30, 1920. Serial No. 370,024.

In Letters Patent No. 1,331,820, dated February 24, 1920, I have described and claimed a lubrication indicator which is adapted to be connected with one of the wheels of an odometer or be suitably driven in a step by step movement, the indicator preferably comprising a wheel which has a proper indicia for lubricating on its periphery, a new indication being brought opposite a sight opening at each movement of the indicator.

According to the present invention I provide a simple device of this type which is adapted to be moved by hand instead of by the speedometer or analogous device. The invention also includes a novel shutter attachment and other improvements which will be hereinafter more fully described.

Referring to the drawings, which illustrate one form of the invention,—

Figure 2:
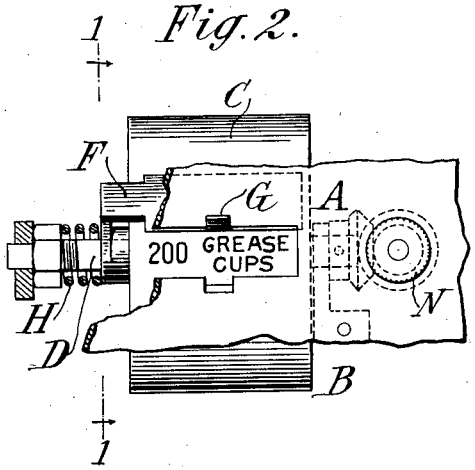
Fig. 2 is a front view, partly in section.
Figure 4:
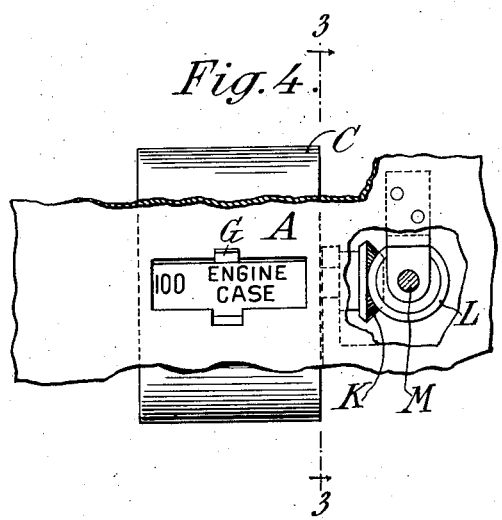
Fig. 4 is a view at right angles to Fig. 3.

In the drawing I have illustrated the device as applied to an automobile wherein there are numerous requirements for lubrication. A indicates the dash-board of an automobile, behind which is mounted an indicator B. The indicator B is shown in the form of a disk wheel having an indicating face C (Fig. 2), the wheel being mounted on a shaft D which is journaled in suitable bearings. The face of the indicator bears suitable legends appropriate to lubrication, such as grease. cups, oil engine case, pack transmission, etc., the indications being spaced apart the proper distance. In connection with each indication is a figure denoting the number of miles at which the particular item of lubrication should be attended to,—thus in Fig. 2 is shown the figure 200 which shows that at 200 miles the grease cups should be refilled. In Fig. 4 is the figure 100 which indicates that at 100 miles the lubricating requirement shown should be attended to, namely, the oiling of the engine.

Assuming that the car has not been used, and the ordinary speedometer stands at nought, then when the car has gone one hundred miles by the speedometer, the indicator will be turned by hand to the position in which it shows one hundred miles, thus indicating the lubricating requirement for that mileage. When the car goes two hundred miles, the indicator will be turned to a position in which two hundred miles shows through the sight opening, whereupon the indication for proper lubrication at that mileage will be shown. So also for three hundred, four hundred and other mileages. These mileages are taken merely as examples, as of course different mileages may be placed upon the indicator. In any event the complete lubricating requirements of the car should be displayed upon the indicator, and preferably in consecutive order, so that by moving the indicator one step or notch at each predetermined interval in the odometer mileage the proper lubrication requirement will be displayed.

My invention also contemplates a means for checking off the indication so that the user, after attending to the particular lubricating requirement, can take some action which will indicate that it has been attended to. The simplest form of device for this purpose is that indicated in the drawing, and comprises a shutter F, which has a hand piece G, by means of which it can be drawn down over the sight opening in the dash. As soon as the particular requirement is attended to, the shutter may be pulled down, and left down until the odometer reaches another lubricating period.

Figure 1:
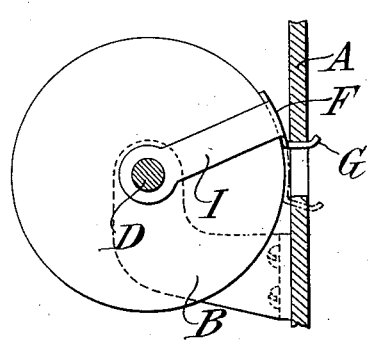
Figure 1 is a side view, partly in section, of the preferred form of the device.

Preferably the parts are so arranged that the shutter does not require to be manually lifted when another lubricating period is reached, but will be automatically lifted by the next step movement of the indicator. This may be accomplished by pivoting the shutter on the shaft D of the lubricator, and by introducing a spring H which bears against the arm I carrying the shutter, so as to introduce a slight friction on the arm. Assuming that the shutter has been moved to the dotted line position in Fig. 1, it is apparent that at the next step movement of the indicator (in counter clockwise direction, as indicated) the shutter will be lifted to the full-line position of Fig. 1, and will remain there owing to its frictional engagement until bodily displaced downwardly by hand.

It is obvious that this construction may also be availed of in the structure set forth in my aforesaid patent, where the indicator is moved by the speedometer instead of by hand.

Figure 3:
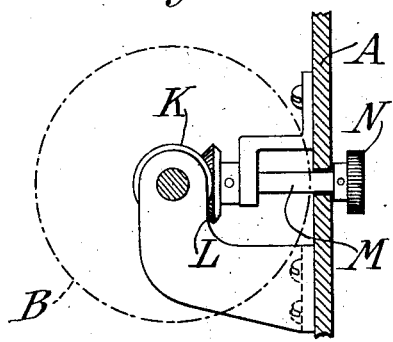
Fig. 3 is a view, illustrating the working mechanism.
Figure 5:
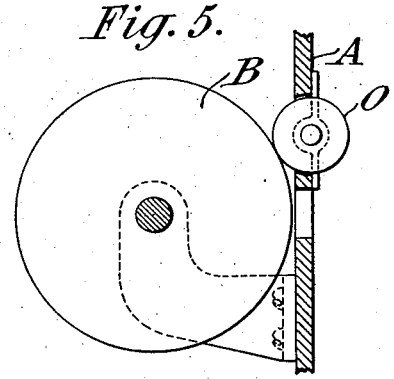
Fig. 5 is a view of a modification.

The indicator may be moved in a number of different ways, as for instance that shown in Figs. 3 and 4, wherein the indicator is provided with a bevelled gear K in which meshes a similar gear L, carried on a shaft M, which extends through the dash and is provided with a thumb-nut N. Or a friction wheel O may be mounted on the dash which engages the periphery of the indicator B (see Fig. 5). Other means of operating the indicator may be availed of, such as providing a portion of the indicator which is accessible to the hand of the operator.

The indicator need not be in wheel form, but may be in other forms, if desired.

In any of the forms shown a click or other frictional device can be used to hold the indicator yieldingly in each of its adjusted positions.

While I have shown and described several forms of the invention, it is understood that I do not wish to be limited thereto, as various changes may be made therein without departing from the spirit of the invention.

What I claim is:—

1. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, and a shutter which may be operated at will to close said sight opening when the required attention has been rendered.

2. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, a shutter which may be operated at will to close said sight opening when the required attention has been rendered, and means controlled by the subsequent rotation of said rotary member for opening said shutter.

3. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, a shutter which may be operated at will to close said sight opening when the required attention has been rendered, and means for automatically opening said shutter when the next element of the series of indicia is moved into register with the sight opening.

4. An indicator for a device having various parts requiring attention as to lubrication, etc., in accordance with its extent of use, said indicator comprising a rotary member having a series of indicia thereon as to the nature of the attention required at different multiples of a predetermined unit of run, means for bringing said indicia in succession in register with a sight opening, a shutter which may be operated to close said sight opening when the required attention has been rendered, said shutter and said rotary member having mutual frictional engagement tending to oppose relative movement therebetween, and means for limiting the movement of said shutter with respect to said sight opening.

5. An indicator for a device having various parts requiring attention as to lubrication, etc., in accordance with its extent of use, said indicator comprising a member having a series of indicia thereon as to the nature of the attention required at different multiples of a predetermined unit of run, said member being settable in different positions whereby it may be caused to selectively bring said indicia in register with a sight opening in the order in which they are to be followed, and a shutter which may be operated at will to close said sight opening when the required attention has been rendered.

6. An indicator for a device having various parts requiring attention as to lubrication, etc., in accordance with its extent of use, said indicator comprising a member having a series of indicia thereon as to the nature of the attention required at different multiples of a predetermined unit of run, said member being settable in different positions whereby it may be caused to selectively bring said indicia in register with a sight opening in the order in which they are to be followed, and a shutter which may be operated to close said sight opening when the required attention has been rendered, and means controlled by the subsequent setting of said movable member for opening said shutter.

In witness whereof, I have hereunto signed my name.

EUGENE V. MYERS.